United States Patent
Mutou et al.

[11] Patent Number: 5,956,159
[45] Date of Patent: Sep. 21, 1999

[54] IMAGE INPUT APPARATUS

[75] Inventors: Hiroyuki Mutou; Masato Iwakawa, both of Tokyo, Japan

[73] Assignee: NEC Corporation, Tokyo, Japan

[21] Appl. No.: 08/753,890

[22] Filed: Dec. 2, 1996

[30] Foreign Application Priority Data

Nov. 30, 1995 [JP] Japan .................................... 7-312223

[51] Int. Cl.[6] .............................. H01L 27/00; H04N 1/04
[52] U.S. Cl. ........................ 358/486; 358/449; 358/474; 358/488; 250/208.1
[58] Field of Search .................................... 358/443, 444, 358/447, 471, 486, 449, 474, 488; 250/208.1, 238.1, 237

[56] References Cited

U.S. PATENT DOCUMENTS

| | | | |
|---|---|---|---|
| 4,687,944 | 8/1987 | Mitsuka et al. | 358/474 |
| 4,724,463 | 2/1988 | Matsumoto | 355/29 |
| 5,181,104 | 1/1993 | Sugishima et al. | 358/486 |
| 5,568,573 | 10/1996 | Wada et al. | 358/449 |
| 5,764,382 | 6/1998 | Shiraishi | 358/496 |

*Primary Examiner*—Edward L. Coles
*Assistant Examiner*—Mark E. Wallerson
*Attorney, Agent, or Firm*—Sughrue, Mion, Zinn, Macpeak & Seas, PLLC

[57] ABSTRACT

An image input apparatus capable of speed-up of image inputting by conducting the image inputting of manuscripts having different sizes with one kind of one-dimensional image sensor, comprising manuscript size setting means for setting a size of a manuscript in a main scanning direction of a one-dimensional image sensor; conveying speed control means for controlling a speed of conveying the manuscript depending upon the size of manuscript being set; driving signal control means for controlling a driving of the one-dimensional image sensor depending upon the size of manuscript being set; shielding means for shielding a predetermined area of the one-dimensional image sensor; and shield area control means for controlling an area to be shielded by the shielding means depending upon the size of the manuscript being set.

12 Claims, 4 Drawing Sheets

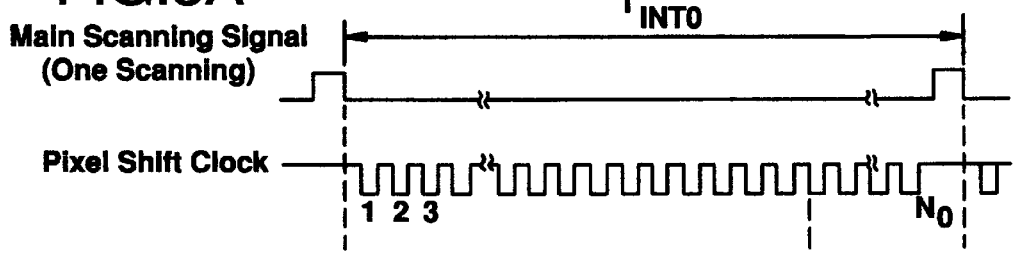
FIG.3A
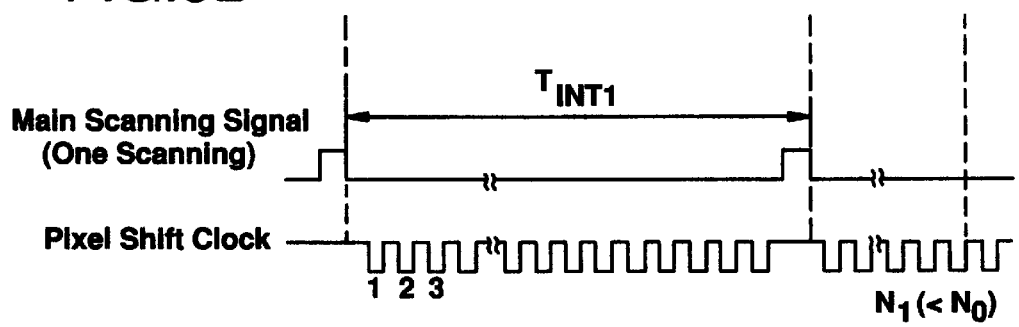
FIG.3B
FIG.5
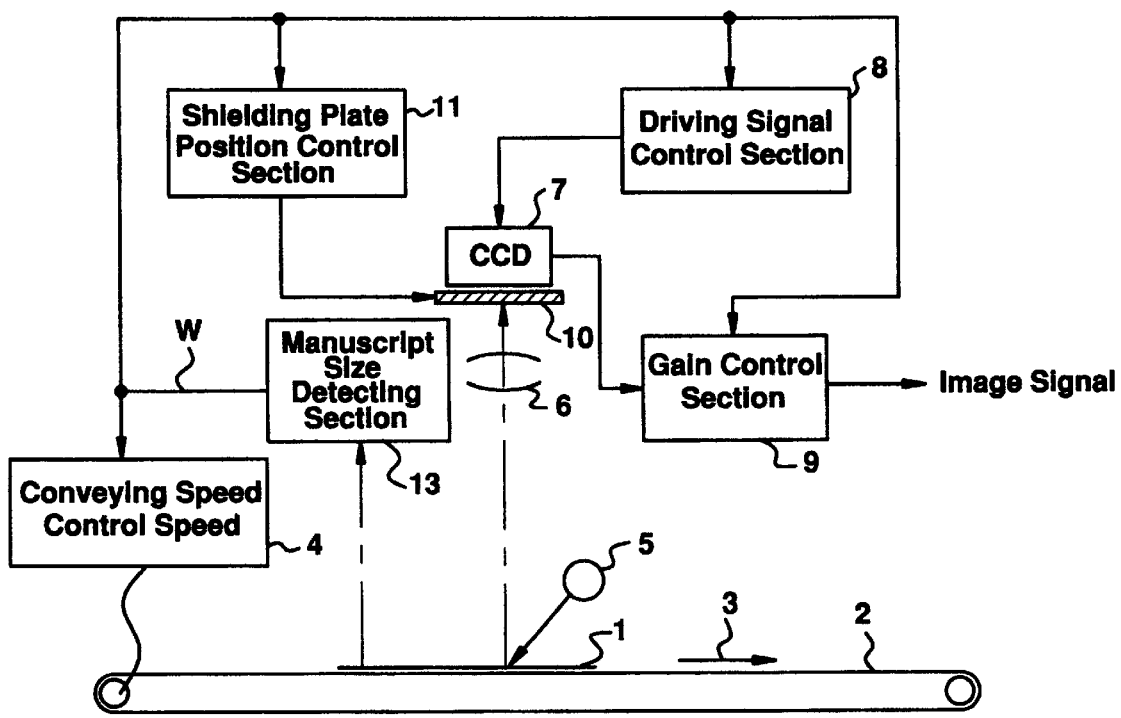

IMAGE INPUT APPARATUS

BACKGROUND OF THE INVENTION

The present invention relates to an image input apparatus utilizing a one-dimensional image sensor.

Conventionally, there is known an image input apparatus utilizing a one-dimensional CCD (charge-coupled device) image sensor, in which pixel signal shift clocks more than the number of pixels which this image sensor holds are supplied per one scanning, and then all the pixel signals of the image sensor are shifted to thereby read out an image.

FIG. 6 is a block diagram showing a conventional image input apparatus, in which reference numeral 1 denotes a manuscript; 2, a manuscript conveying mechanism constituting manuscript conveying means by conveying the manuscript 1 in a conveying direction 3 at a preset speed; 4, a conveying speed control section that adjusts the speed of conveying the manuscript conveying-mechanism 2 to a desired speed; 5, a light source for irradiating light with a desired illumination to the manuscript 1; 6, a lens for imaging image information obtained from the manuscript 1 onto a one-dimensional CCD image sensor 7; 7a, 7b and 7c, one-dimensional CCD image sensors each having different number of read-out pixels (number of photocells); 8, a driving signal control section that outputs pixel signal shift clocks that successively shift the output signals from photocells, and outputs main scanning signals; 9, a gain control section that adjusts the gain of output signals from the one-dimensional CCD image sensors 7a, 7b and 7c.

Now, the description is made of an operation of a conventional example having the above construction.

First, prior to a read-out of a manuscript, an image sensor having the number of photocells corresponding to the size of a manuscript in a main scanning direction is selected among one-dimensional CCD image sensors 7a, 7b and 7c, where, for example, the one-dimensional CCD image sensor 7b is selected.

Next, the manuscript 1 is placed on the manuscript conveying mechanism 2 with its read-out surface turned up, and the manuscript 1 is conveyed at a preset conveying speed along the conveying direction 3 with irradiating light from the light source 5 having a desired illumination onto the read-out surface of the manuscript. This conveying speed is set in the conveying speed control section 4 in advance. Then, the main scanning signal is supplied to the one-dimensional CCD image sensor 7b from the driving signal control section 8 to read out the image information in the manuscript 1 through the lens 6. The read-out image is supplied to the gain control section 9 by shifting one pixel after another by the pixel shift clock supplied from the driving signal control section 8. The image information is amplified to the desired level at the gain section 9 and output as image signals.

FIG. 7 is a time chart showing the main scanning signal and the pixel shift clock in the conventional image input apparatus. $T_{INT0}$ is a time required for one scanning, $\Delta t$ is a minimum time required for shifting one pixel signal, and $N_o$ is the number of all the photocells constituting the one-dimensional CCD image sensor 7b.

Here, the time required for one scanning $T_{INT0}$ has the relation with the number of photocells in the one-dimensional CCD image sensor 7b as shown in the following equation:

$$T_{INT0} \geq \Delta t \times N_o$$

That is, the time required for one scanning $T_{INT0}$ has a lower limit (minimum value) of $\Delta t \times N_o$.

Thus, the conventional image input apparatus has such a problem that since the time required for one scanning $T_{INT0}$ has a lower limit, there is an upper limit in a speed of conveying a manuscript, and also a limitation in the speedup of image inputting.

Also, when image information is read out so a line density in the main scanning direction as to be consistent irrespective of a size of manuscript, there is a problem that a plurality of image sensors with different number of photocells are required to be prepared depending upon the sizes of manuscripts.

SUMMARY OF THE INVENTION

The present invention is achieved to solve the above-mentioned problems, and has an object of the invention to provide an image input apparatus capable of shortening a time required for one scanning than the above-mentioned lower limit, and further capable of reading out images with one kind of image sensor irrespective of a manuscript size.

To achieve the above-mentioned object and other objects, according to the present invention, there is provided an image input apparatus comprising: manuscript size setting means for setting a size of a manuscript in a main scanning direction of a one-dimensional image sensor; conveying speed control means for controlling a speed of conveying the manuscript depending upon the size of manuscript being set; driving signal control means for controlling a driving of the one-dimensional image sensor depending upon the size of manuscript being set; shielding means for shielding a predetermined area of the one-dimensional image sensor; and shield area control means for controlling an area to be shielded by the shielding means depending upon the size of the manuscript being set.

With such a construction, a time required for one scanning can be shortened depending upon the sizes of the manuscripts, and further, image information can be read out from the manuscripts having different sizes by installing just a single one kind of one-dimensional image sensor.

BRIEF DESCRIPTION OF THE DRAWINGS

FIG. 3 is a time chart of one scanning signal outputted from a driving signal control section in FIG. 1 and a pixel shift clock;

FIG. 5 is a block diagram showing another embodiment of the invention;

DETAILED DESCRIPTION OF THE PREFERRED EMBODIMENTS

Next, the detailed description will be made of the present invention with reference to the accompanying drawings.

Figure 1:
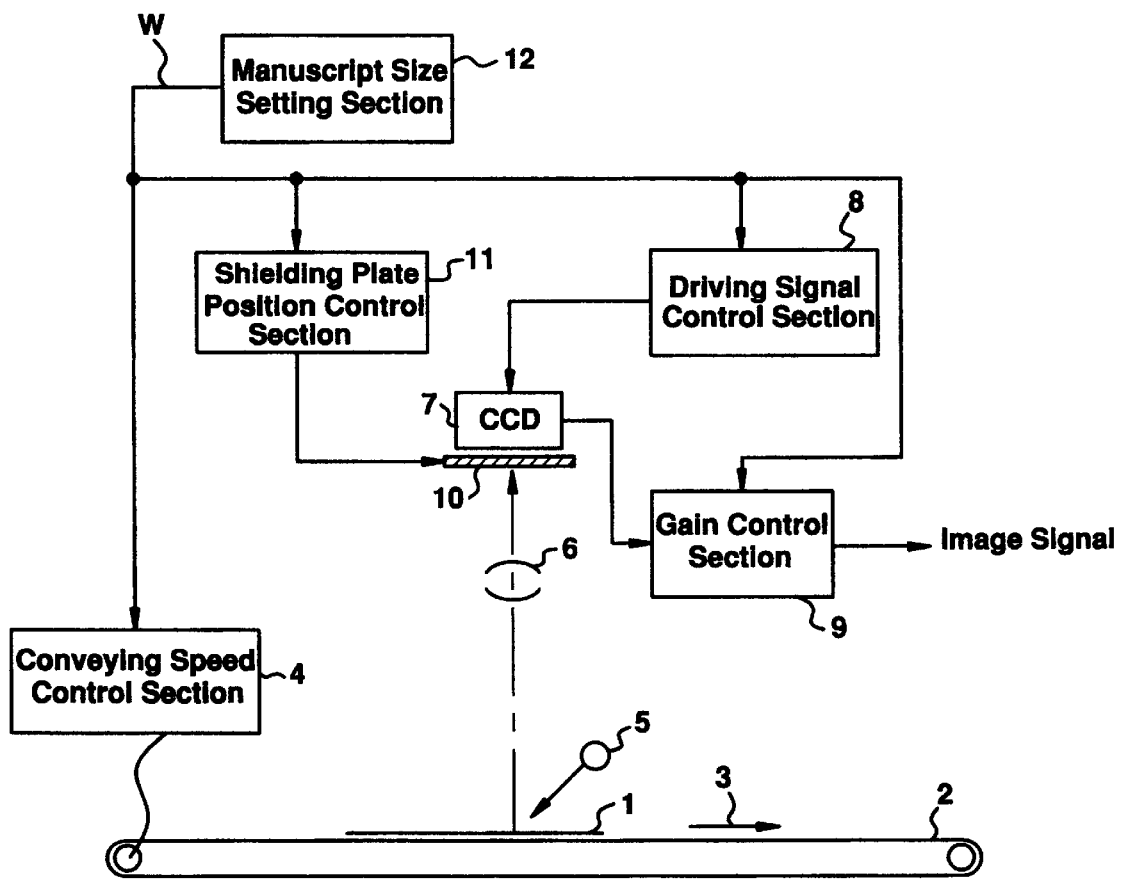
FIG. 1 is a block diagram showing one embodiment of the present invention.

FIG. 1 is a block diagram showing one embodiment of the present invention.

Figure 6:
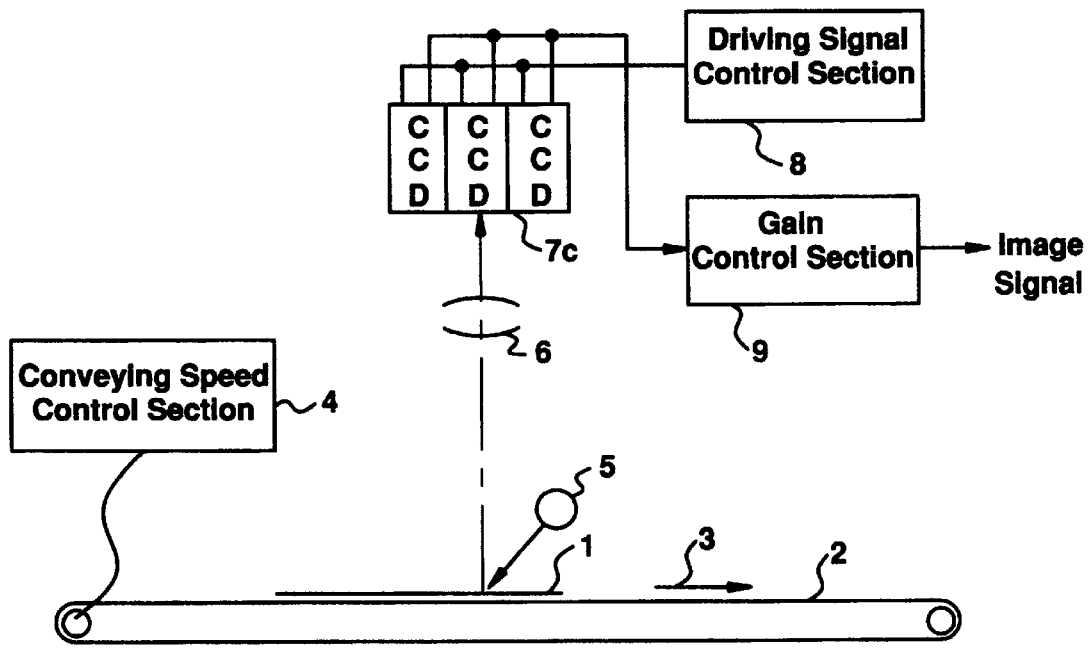
FIG. 6 is a block diagram showing a conventional example.
Figure 7A:
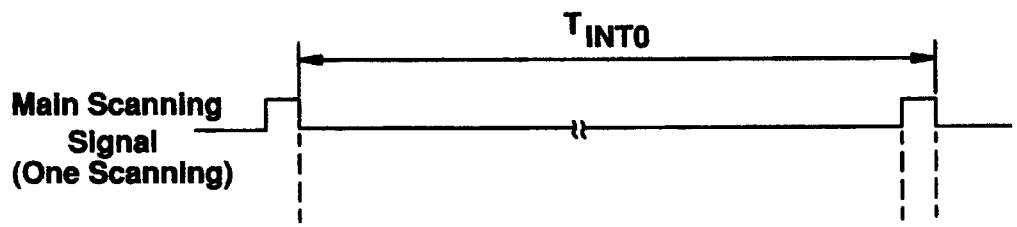
FIG. 7 is a time chart of one scanning signal outputted from a driving signal control section in FIG. 6 and a pixel shift clock.
Figure 7B:
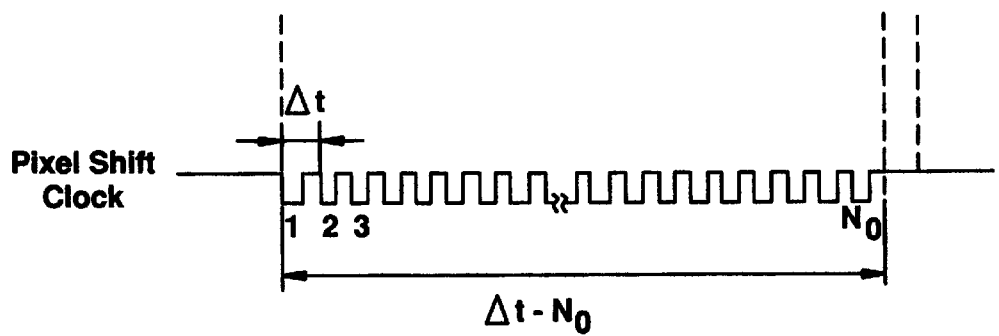

In FIG. 1, like numerals in FIG. 6 represent like parts or equivalent parts. Reference numeral 7 denotes a one-dimensional CCD image sensor consisting of a plurality of photocells; 10, a shielding plate constructing shielding means for shielding photocells within a predetermined area of the one-dimensional CCD image sensor 7 by changing the position along a main scanning direction; 11, a shielding plate position control section constructing shield area control means by adjusting a shield area with a shield plate depending upon a size W of a manuscript or document; and 12, a manuscript size setting section for setting a size W of the manuscript.

An operation of the invention according to the above-mentioned construction will be described with reference to FIG. 1.

First, prior to read out of a manuscript, a size W of a manuscript in a main scanning direction of a one-dimensional CCD image sensor 7 is set by a manuscript size setting section 12. This size W of the manuscript is supplied to a conveying speed control section 4, a shield plate position control section 11, a driving signal control section 8 and a gain control section 9 from the manuscript size setting section 12.

Figure 2:
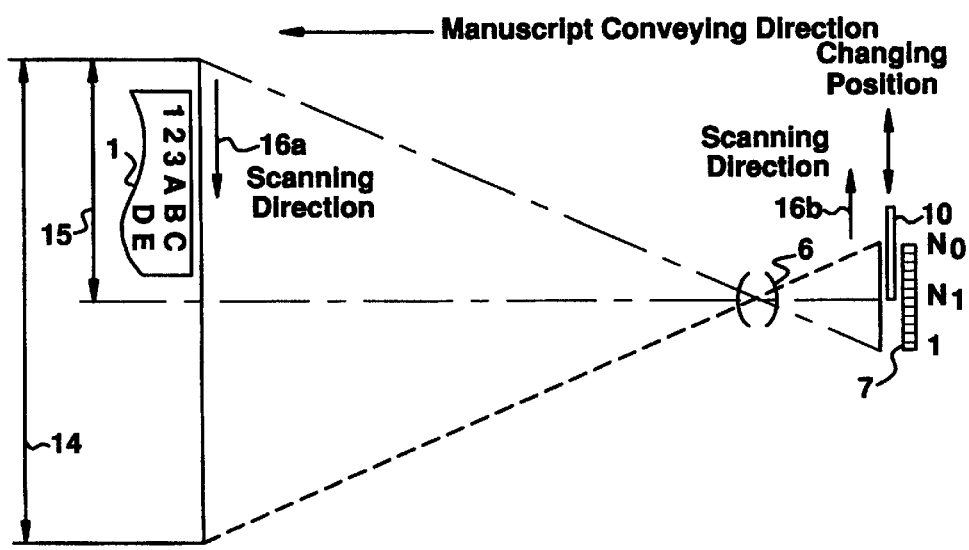
FIG. 2 is a view illustrating a relation between a shield plate 10 and a range of vision of a one-dimensional CCD image sensor in FIG. 1.
Figure 4A:
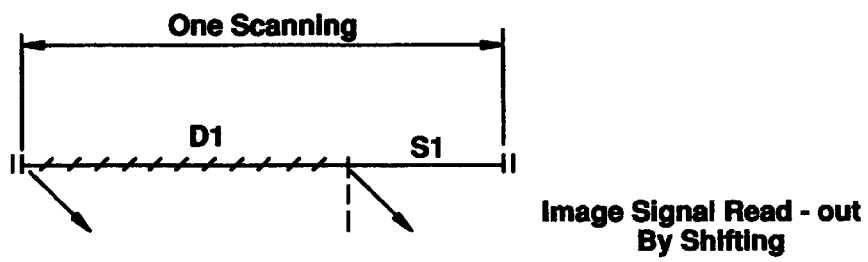
FIG. 4 is a view illustrating an example in which ⅔ of photocells of the whole valid pixel are shielded and ⅓ of photocells are exposed to light in a driving operation of the one-dimensional CCD image sensor in FIG. 1.
Figure 4B:
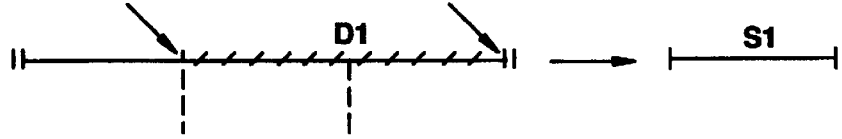
Figure 4C:
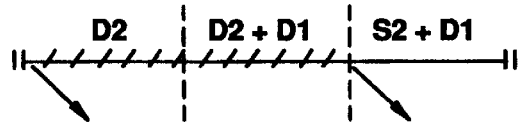
Figure 4D:
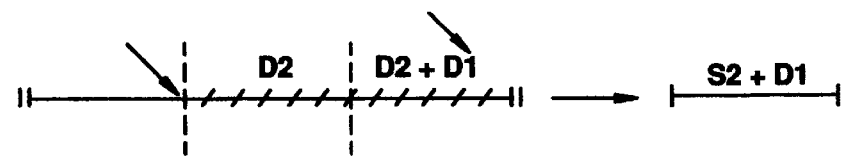
Figure 4E:
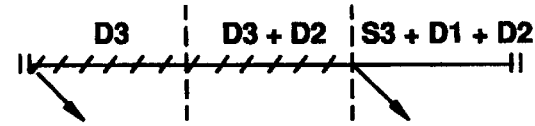
Figure 4F:
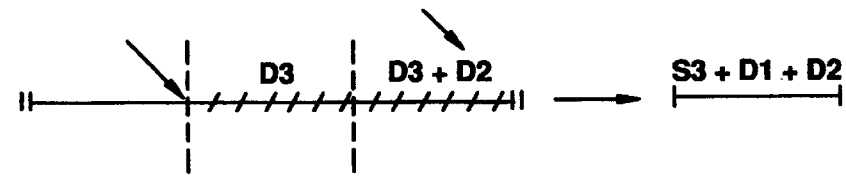
Figure 4G:
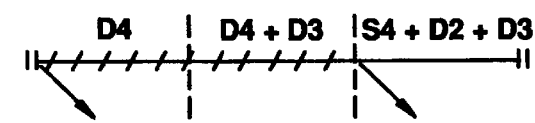
Figure 4H:
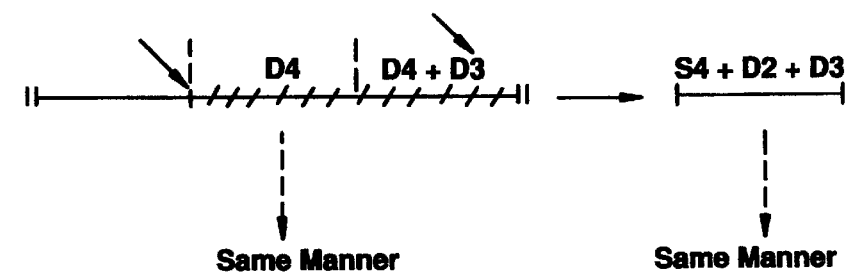

FIG. 2 describes a relation between a shield plate 10 and a range of vision of the one-dimensional CCD image sensor 7 in FIG. 1, and reference numeral 14 denotes the whole range of vision which is a range of vision when not shielded. Reference numeral 15 denotes a range of vision required for a read-out of a manuscript, and reference numerals 16a and 16b denote main scanning directions of the one-dimensional CCD image sensor 7. Here, the number of photocells $N_1$ required for the image read-out operation of the manuscript 1 is defined as $N_1=W\times L+\alpha$ (L: desired line density in a main scanning direction, $\alpha$: a constant peculiar to CCD).

Now, when the manuscript size W is supplied to the shield plate position control section 4, a position of the shield plate 10 is adjusted so as to secure the range of vision 15 among the whole range of vision 14, which is a range required to be read out. Then, photocells $N_0$ to $N_1+1$ are shielded, the range of vision 15 is constructed by photocells 1 to $N^1$, and read-out of the image information of the manuscript 1 is conducted.

FIG. 3 is a time chart of a main scanning signal (per one scanning) outputted from the driving signal control section 8 in FIG. 1 and a pixel shift clock. $T_{INT0}$ is a time required for one scanning when a range of vision of a one-dimensional CCD image sensor 7 is the whole range of vision 14. $T_{INT1}$ is a time required for one scanning when a range of vision of the one-dimensional image sensor 7 is a range of vision 15, and $T_{INT1}=\Delta t\times N_1+\beta$ ($\beta$: a constant peculiar to CCD) is established.

Now, when a manuscript size W is supplied to the driving signal control section 8, the driving signal control section 8 designates a time required for one scanning of a main scanning signal as $T_{INT1}$ and the number of pulses of a pixel shift clock as $N_1$.

Also, when a manuscript size W is supplied to a conveying speed control section 4, the conveying speed control section 4 adjusts a conveying speed V of a manuscript conveying mechanism 2 to $V=(T_{INT1}\times L)^{-1}$ so as to ensure an image of a desired line density L.

As mentioned above, image information reading out operation is conducted after the manuscript size W is supplied to each circuit. A manuscript 1 placed on the manuscript conveying mechanism 2 is conveyed in a conveying direction 3 at a speed V with irradiating light onto its read-out surface by a light source 5. The driving signal control section 8 supplies a main scanning signal, a time required for one scanning of which is $T_{INT1}$ to the one-dimensional CCD image sensor 7. The one-dimensional CCD image sensor 7 that received the main scanning signal reads out the image information of the manuscript 1 at photocells 1 to $N_1$ through lenses 6. The read-out image information has a desired line density L and the range of vision corresponds to the manuscript.

However, since the output level declines in conjunction with $T_{INT1}$ getting small and influence the quality of images, it is amplified as a gain $G=(N_0/N_1)\times G_0$ ($G_0$: a gain at the time the whole pixel $N_0$ are shifted) so as to ensure an image signal output at a consistent level.

Next, the influence of a dark output signal generated in shielded photocells in a one-dimensional CCD image sensor 7 of FIG. 1 exerted on an image signal obtained in non-shielded photocells will be described with reference to drawings.

Generally in a CCD image sensor, it is known that an invalid signal called a dark output is generated in shielded photocells.

FIG. 4 shows an example in which ⅔ of photocells of the whole valid pixel in a one-dimensional CCD image sensor 7 in FIG. 1 are shielded and ⅓ of photocells are exposed to light. In FIG. 4, symbols D1 to D4 denote invalid signals (dark output signals) per one scanning generated in the shielded photocells, and symbols S1 to S4 denote valid signals (photoelectric conversion signals) per one scanning generated in the exposed photocells.

In the same drawing, (a) shows a signal within a shift register (not shown) after finalizing one scanning since beginning an image read-out. (b) shows a situation in which a valid signal S1 is read out by shifting ⅓ of the whole pixel from the situation of (a). (c) shows a situation in which a signal electric charge of a second scanning is overlapped on the shift register of the situation (b). (d) shows a situation in which a pixel signal S2+D1 including a valid signal S2 is read out by shifting ⅓ of the whole pixel from the situation (c).

The same operation is conducted in the subsequent situations.

From FIG. 4, it is understood that a valid signal is overlapped on a pixel signal which is shifted and read out. However, since a dark output level in the ordinary CCD image sensor is very small at one thousandths of the saturation signal level of a CCD image sensor, the cumulative magnitude of a dark output level is negligible against the level of a valid signal unless the number of photocells is extremely small against the whole number of valid pixel.

However, lighting with enough illumination is required to ensure a valid signal level which is more than several tens percentage larger than the saturation signal level.

FIG. 5 is a block diagram showing another embodiment of the present invention. In FIG. 5, like numerals in FIG. 1 represent like parts or equivalent parts. Reference numeral 13 denotes a manuscript size detecting section for detecting a size of a manuscript 1 automatically prior to read-out operation. A manuscript size detected in the manuscript size detecting section 13 is supplied to a conveying speed control section 4, a shield plate position control section 11, a driving signal control section 8, and a gain control section 9. Operations thereafter are the same as those in FIG. 1. Thus, provided with a circuit which automatically detects a manuscript size, a time required for an image input (through put), in case various sizes of manuscripts are mixed, can be shortened.

It should be noted that a one-dimensional CCD image sensor 7 used in FIG. 1 and FIG. 5 may be either color or monochrome, and such an electronic shutter (mask) utilizing liquid crystal may also be used instead of a shielding plate 10 that moves mechanically.

As described above, in an image input apparatus according to the present invention, as a predetermined area of a one-dimensional image sensor is covered by shielding means and shielded, one scanning is completed when only a pixel signal read out on a non-shielded portion is shifted, and a time required for one scanning can be largely shortened compared with the conventional apparatus. That is, speed-up of an image inputting can be attained.

Further, since a range of vision for an image read-out can be adjusted depending upon a size of a manuscript, image information can be read out with one kind of image sensor while maintaining a line density in a main scanning direction.

Furthermore, the size of the manuscript can automatically be detected by providing a manuscript size detecting section, and a time required for an image input can be shortened even in the case where various sizes of the manuscript are mixed.

What is claimed is:

1. An image input apparatus comprising;
    conveying means for conveying a document in a preset direction;
    an image sensor for reading out image information from the document conveyed by said conveying means, said image sensor having a plurality of photocells in a main scanning direction;
    size setting means for setting a reading size read out by said image sensor in said main scanning direction;
    conveying speed control means for controlling a conveying speed of the document depending upon said reading size;
    controlling means for controlling a scanning time required for one scanning in said main scanning direction in accordance with said reading size;
    shielding means for shielding an area of said image sensor to provide a shielded area of said image sensor; and
    shielding controlling means for controlling said shielding means to change said shielded area according to said reading size,
    wherein said image sensor outputs an image signal corresponding to said image information except for said shielded area shielded by said shielding means.

2. An image input apparatus as claimed in claim 1, wherein said reading size is determined according to a size of said document.

3. An image input apparatus as claimed in claim 1, wherein said reading size setting means includes means for detecting a size of the document read-out by said image sensor.

4. An image input apparatus as claimed in claim 1, wherein said image sensor is of a one-dimensional CCD image sensor.

5. An image input apparatus as claimed in claim 1, further comprising gain control means for controlling a gain of an image signal corresponding to said image information delivered from said image sensor in response to the time of said main scanning signal.

6. An image input apparatus as claimed in claim 1, wherein said controlling means further controls the number of read-out photocells in said image sensor in accordance with said reading size.

7. An image input apparatus as claimed in claim 6, wherein said controlling means determines said scanning time in accordance with the number of read-out photocells.

8. An image input apparatus as claimed in claim 6, wherein said conveying speed control means determines said conveying speed as a function of said reading size and the number of read-out photocells.

9. An image input apparatus as claimed in claim 6, further comprising a gain controller for controlling a gain of said image sensor in accordance with the number of read-out photocells.

10. An image input apparatus as claimed in claim 6, wherein the number of read-out photocells and said scanning time are decreased in accordance with decrease of said reading size.

11. an image input apparatus as claimed in claim 9, wherein said gain is increased in accordance with decrease of said reading size.

12. An image input apparatus as claimed in claim 11, wherein said gain and said conveying speed are increased in accordance with decrease of said reading size.

* * * * *